US012327532B2

(12) United States Patent
Sung et al.

(10) Patent No.: US 12,327,532 B2
(45) Date of Patent: Jun. 10, 2025

(54) DISPLAY PANEL HAVING A BACKLIGHT SOURCE WITH A DIMMING FUNCTION

(71) Applicants: InnoLux Corporation, Miao-Li County (TW); CARUX TECHNOLOGY PTE. LTD., Singapore (SG)

(72) Inventors: Chao-Chin Sung, Tainan (TW); Hsin-Cheng Hung, Miao-Li County (TW); Chien-Tzu Chu, Tainan (TW); Li-Wei Sung, Tainan (TW)

(73) Assignees: INNOLUX CORPORATION, Miao-Li County (TW); CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/354,082

(22) Filed: Jul. 18, 2023

(65) Prior Publication Data

US 2024/0062731 A1 Feb. 22, 2024

Related U.S. Application Data

(60) Provisional application No. 63/371,650, filed on Aug. 17, 2022.

(30) Foreign Application Priority Data

Apr. 28, 2023 (CN) ........................ 202310474486.1

(51) Int. Cl.
*G09G 3/34* (2006.01)

(52) U.S. Cl.
CPC ... *G09G 3/3426* (2013.01); *G09G 2320/0233* (2013.01); *G09G 2320/0646* (2013.01); *G09G 2360/144* (2013.01)

(58) Field of Classification Search
CPC .......... G09G 3/3406–3426; G09G 2320/0233; G09G 2320/0646; G09G 2360/144
See application file for complete search history.

(56) References Cited

U.S. PATENT DOCUMENTS 8,111,223 B2 2/2012 Yeo et al.
8,730,148 B2 * 5/2014 Park ........................ H05B 45/20 345/102

(Continued)

FOREIGN PATENT DOCUMENTS

CN 101494025 A 7/2009
CN 202796005 U 3/2013
TW 201021004 A 6/2010

OTHER PUBLICATIONS

Chinese language office action dated Feb. 1, 2024, issued in application No. TW 112116027.

*Primary Examiner* — Gene W Lee
(74) *Attorney, Agent, or Firm* — McClure, Qualey & Rodack, LLP

(57) ABSTRACT

An electronic device includes a display panel, a backlight source, an ambient light sensor, and a controller. The backlight source is disposed below the display panel and includes light-emitting units. The ambient light sensor detects the brightness of the ambient light. The controller judges the modes of the electronic device according to the detecting results of the ambient light sensor. When the electronic device is in a low-brightness mode, the brightness of a white frame of the display panel is greater than 0 nit and less than or equal to 50 nits, and in a general mode, the brightness of the white frame of the display panel is greater than 50 nits. The backlight source includes a local dimming function. When in the low-brightness mode, the local dimming function is in a first mode. When in the general mode, the local dimming function is in a second mode.

8 Claims, 10 Drawing Sheets

(56) References Cited

U.S. PATENT DOCUMENTS

| | | | | |
|---|---|---|---|---|
| 8,829,807 | B1 * | 9/2014 | Yang | G09G 3/3406 315/307 |
| 11,107,440 | B2 * | 8/2021 | Aurongzeb | H04W 4/30 |
| 2011/0157489 | A1 * | 6/2011 | Ichioka | H04N 5/58 348/790 |
| 2012/0019493 | A1 * | 1/2012 | Barnhoefer | H05B 41/3922 345/207 |
| 2017/0316754 | A1 * | 11/2017 | Katougi | G09G 3/2003 |
| 2020/0160813 | A1 * | 5/2020 | Aurongzeb | G09G 3/36 |
| 2023/0186816 | A1 * | 6/2023 | Min | G09G 3/3283 345/690 |

* cited by examiner

DISPLAY PANEL HAVING A BACKLIGHT SOURCE WITH A DIMMING FUNCTION

CROSS REFERENCE TO RELATED APPLICATIONS

This application claims priority of U.S. Provisional Application No. 63/371,650, filed Aug. 17, 2022, and China Patent Application No. 202310474486.1, filed on Apr. 28, 2023, the entirety of which is incorporated by reference herein.

BACKGROUND OF THE DISCLOSURE

Field of the Disclosure

The disclosure relates to an electronic device, and in particular, to an electronic device capable of improving the frame uniformity of a low-brightness or a low gray-level.

Description of the Related Art

In a conventional display device, in a low-brightness or a low gray-level, parameter values related to the threshold voltage (Vth) and the parasitic capacitance of a thin film transistor (TFT) may affect a driving current of a backlight source. As a result, the entire brightness uniformity of the backlight source is compromised. This can cause poor frame quality at the low gray-level and the low brightness. Therefore, a new design for a circuit structure is needed to solve the problem described above.

BRIEF SUMMARY OF THE DISCLOSURE

An embodiment of the disclosure provides an electronic device, which includes a display panel, a backlight source, an ambient light sensor and a controller. The backlight source is disposed below the display panel and includes a plurality of light-emitting units. The ambient light sensor is configured to detect the brightness of ambient light. The controller is electrically connected to the display panel, the backlight source, and the ambient light sensor. The controller is configured to judge the general mode or low-brightness mode according to according to detecting results of the ambient light sensor. In the low-brightness mode, the brightness of a white frame of the display panel is greater than 0 nit and less than or equal to 50 nits. In the general mode, the brightness of the white frame of the display panel is greater than 50 nits. The backlight source includes a local dimming function. When the controller judges the low-brightness mode, the local dimming function is in a first mode. When the controller judges the general mode, the local dimming function is in a second mode.

An embodiment of the disclosure provides an electronic device, which includes a display panel and a backlight source. A frame displayed on the display panel is formed by a plurality of sub-frames corresponding to different colors. When the frame displayed on the display panel has a maximum brightness, the frames have a maximum gray-level value at the same time. The backlight source is disposed below the display panel and includes a plurality of light-emitting units. The backlight source includes a local dimming function. When the gray-level value of the position of each of the sub-frames corresponding to the first frame area is greater than a zero gray-level value, and less than or equal to ⅕ of the maximum gray-level value in the first frame area of the frame displayed on the display panel, and the gray-level value of the position of at least one of the sub-frames corresponding to the second frame area is greater than ⅕ of the maximum gray-level value in the second frame area outside the first frame area, then the local dimming function uses the first mode to control the light-emitting units corresponding to the first backlight area of the first frame area, and the second mode to control the light-emitting units corresponding to the second backlight area of the second frame area.

BRIEF DESCRIPTION OF THE DRAWINGS

The disclosure can be fully understood by reading the subsequent detailed description and examples with references made to the accompanying drawings, wherein.

DETAILED DESCRIPTION OF THE DISCLOSURE

Figure 1:
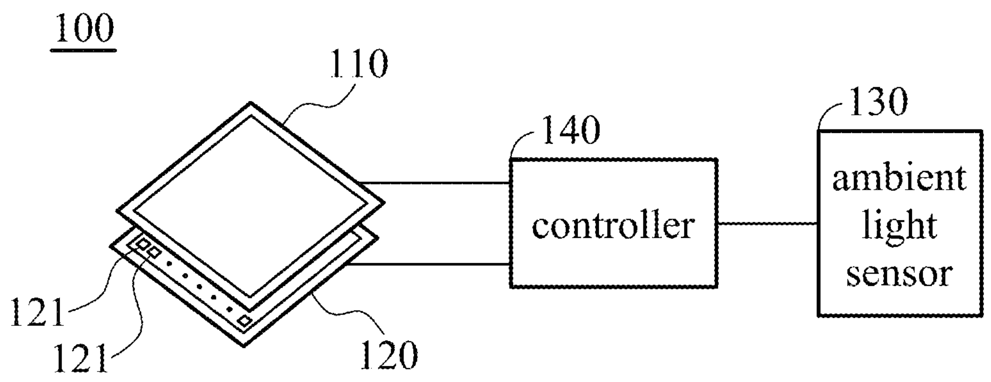
FIG. 1 is a schematic view of an electronic device according to an embodiment of the disclosure.

In order to make objects, features and advantages of the disclosure more obvious and easily understood, the embodiments are described below, and the detailed description is made in conjunction with the drawings. In order to help the reader to understand the drawings, the multiple drawings in the disclosure may depict a part of the entire device, and the specific components in the drawing are not drawn to scale.

The specification of the disclosure provides various embodiments to illustrate the technical features of the various embodiments of the disclosure. The configuration, quantity, and size of each component in the embodiments are for illustrative purposes, and are not intended to limit the disclosure. In addition, if the reference number of a component in the embodiments and the drawings appears repeatedly, it is for the purpose of simplifying the description, and does not mean to imply a relationship between different embodiments.

Furthermore, use of ordinal terms such as “first”, “second”, etc., in the specification and the claims to describe a claim element does not by itself connote and represent the claim element having any previous ordinal term, and does not represent the order of one claim element over another or the order of the manufacturing method, either. The ordinal terms are used as labels to distinguish one claim element having a certain name from another element having the same name.

In the disclosure, the technical features of the various embodiments may be replaced or combined with each other to complete other embodiments without being mutually exclusive.

In some embodiments of the disclosure, unless specifically defined, the term “coupled” or “electrically connected” may include any direct and indirect means of electrical connection.

In the text, the terms “substantially” or “approximately” usually means within 20%, or within 10%, or within 5%, or within 3%, or within 2%, or within 1%, or within 0.5% of a given value or range. The quantity given here is an approximate quantity. That is, without the specific description of “substantially” or “approximately”, the meaning of “substantially” or “approximately” may still be implied.

The “including” mentioned in the entire specification and claims is an open term, so it should be interpreted as “including or comprising but not limited to”.

Furthermore, the term “connected” herein includes any direct and indirect connection means. Therefore, an element or layer is referred to as being “connected to” or “coupled to” another element or layer, the element or layer can be directly on, connected or coupled to another element or layer or intervening elements or layers may be present. When an element is referred to as being “directly connected to” or “directly coupled to” another element or layer, there are no intervening elements or layers present. Unless specifically defined, the term “coupled” or “electrically connected” may include any direct and indirect means of electrical connection.

In an embodiment, the electronic device may include a display device, a backlight device, an antenna device, a sensing device, a splicing device or a therapeutic diagnosis device, but the disclosure is not limited thereto. The electronic device may be a bendable or flexible electronic device. The display device may be a non-self-luminous type display device or a self-luminous type display device. The antenna device may be a liquid-crystal type antenna device or a non-liquid-crystal type antenna device, and the sensing device may be a sensing device that senses capacitance, light, heat or ultrasound, but the disclosure is not limited thereto. The electronic component may include a passive component and an active component, such as a capacitor, a resistor, an inductor, a diode, a transistor, etc. The diode may include a light-emitting diode (LED) or a photodiode (PD). The light-emitting diode may include, for example, an organic light-emitting diode (OLED), a mini LED, a micro LED or a quantum dot LED, but the disclosure is not limited thereto. The splicing device may be, for example, a display splicing device or an antenna splicing device, but the disclosure is not limited thereto. It should be noted that the electronic device may be any arrangement and combination of the above devices, but the disclosure is not limited thereto. Hereinafter, the display device will be used as an electronic device to illustrate to the content of the disclosure, but the disclosure is not limited thereto.

FIG. 1 is a schematic view of an electronic device according to an embodiment of the disclosure. Please refer to FIG. 1. The electronic device 100 may at least include a display panel 110 and a backlight source 120. In some embodiments, the electronic device 100 may further include an ambient light sensor 130. The ambient light sensor 130 may output a signal to control a panel brightness of the display panel 110. Furthermore, the electronic device 100 may further include a controller 140. The controller 140 may be electrically connected to the display panel 110, the backlight source 120 and the ambient light sensor 130.

In the embodiment, the display panel 110 may be a liquid crystal display panel (LCD panel), but the disclosure is not limited thereto. The display panel 110 may include a plurality of pixel units, and each of the pixel unit may at least include a thin film transistor (TFT), but the disclosure is not limited thereto.

The backlight source 120 may be disposed below the display panel 110, and include a plurality of light-emitting units 121, wherein the light-emitting units 121 may be light-emitting diodes, but the disclosure is not limited thereto. Furthermore, the backlight source 120 may be disposed below the display panel 110 when viewed from the top view, and the light-emitting units 121 may be arranged in a matrix, but the disclosure is not limited thereto. In addition, the backlight source 120 may have a local dimming function. In the embodiment, the local dimming function may enable the light-emitting units 121 in the first backlight area of the backlight source 120 to emit light and enable the light-emitting units 121 in the second backlight area outside the first backlight area of the backlight source to not emit light, wherein the first backlight area is different from the second backlight area, but the disclosure is not limited thereto. For example, in some embodiments, the local dimming function may adjust the first backlight area of the backlight source 120 to the first brightness, and adjust the second backlight area outside the first backlight area of the backlight source 120 to the second brightness, wherein the first brightness is different from the second brightness. It should be noted that in the disclosure, for the sake of simplification, the term “backlight area” is used generally to refer to the light-emitting units 121 located in the backlight area. For example, “adjusting the first backlight area to the first brightness” refers to adjusting the light-emitting units

121 located in the first backlight area of the backlight source 120 to the first brightness. The rest of the terms may be deduced by analogy.

As shown in FIG. 1, the backlight source 120 and the display panel 110 are controlled by the controller 140, and the controller 140 may adjust the brightness of the backlight source 120 and the brightness of the display panel 110 according to the signal output by the ambient light sensor 130 after sensing. In some embodiments, when the ambient light is weak (such as indoors or at night), the controller 140 may judge the low-brightness mode. More specifically, the brightness of the white frame of the display panel 110 (that is, the maximum brightness of the panel) may be changed by the detecting results of the ambient light sensor 130. When the ambient light is weak and the low-brightness mode is entered, the brightness of the white frame is reduced to a range greater than 0 nit and less than or equal to 50 nits due to low-brightness mode (as shown in the area A1 in FIG. 2), the local dimming function of the backlight source 120 may be in the first mode, wherein the relationship between the brightness of the white frame and the upper limit of the backlight brightness is represented by the straight line RA1 in FIG. 2. In some embodiments, in the first mode, the local dimming function of the backlight source 120 may be turned off, so that the entire backlight source 120 may emit light at a predetermined brightness value L1, as shown in FIG. 3A, but the disclosure is not limited thereto. In FIG. 3A, the reference number "310" is the display frame of the display panel 110, and the reference number "320" is the light-emitting state of the backlight source 120. It can be seen from FIG. 3A that all the light-emitting units 121 of the backlight source 120 may emit light at the predetermined brightness value L1, so that the backlight source 120 generates a backlight with the predetermined brightness value L1. That is, the area A1 shown in FIG. 2 corresponds to the low-brightness mode, and the brightness value L1 of the backlight brightness of the backlight source 120 is fixed. It should be noted that since the display panel 110 in the disclosure does not itself emit light, it controls the transmittance of the light through the pixel units to form a frame, the display frame 310 also corresponds to the light transmittance distribution of the display panel 110 itself. The above "brightness of the white frame" refers to the brightness of the light emitted by the display panel 110 after the light is emitted by the backlight source 120 and penetrates the display panel 110 when the light transmittance of the display panel 110 is maximum.

In addition, in some embodiments, when the ambient light is strong (for example, generally outdoors), the controller 140 may judge the general mode. At this time, the brightness of the white frame of the display panel 110 may be greater than 50 nits, and the local dimming function of the backlight source 120 may be in the second mode, as shown in the area B1 in FIG. 2. In the embodiment, in the second mode, the maximum brightness value of the backlight brightness of the backlight source 120 may increase with the increase of the brightness of the white frame of the display panel 110, and the relationship between the brightness of the white frame and the upper limit of the backlight brightness is represented by the straight line RB1 in FIG. 2. However, at the same time, the local dimming function may also be used, so that the brightness distribution of the backlight source 120 may correspond to the brightness distribution of the frame displayed on the display panel 120, as shown in FIG. 3B, but the disclosure is not limited thereto. More specifically, In FIG. 3B, the reference number "311" is the display frame of the display panel 110 (corresponding to the light transmittance distribution of the display panel 110 itself), and the reference number "321" is the backlight state of the backlight source 120. It can be seen from 3B that the brightness distribution of all the light-emitting units 121 of the backlight source 120 may correspond to the brightness distribution of the frame of the display panel 110. It should be noted that the relationship between the brightness of the white frame (that is, the maximum brightness displayed by the panel) and the upper limit of the backlight brightness is represented in the area B1 in FIG. 2, and the local dimming function is turned on in the second mode. Therefore, when a dark block appears in the frame (such as the black part of the frame 311), the local dimming function may enable the part of backlight source 120 corresponding to the dark block to dim or even not to emit light. In addition, although the relationship between the brightness of the white frame and the upper limit of the backlight brightness is expressed as a linear ratio of the straight line shape in the disclosure, in some embodiments, the relationship between the brightness of the white frame and the upper limit of the backlight brightness may be expressed as an non-linear ratio of the non-straight line shape.

Furthermore, in some embodiments, when the brightness of the white frame of the display panel 110 is equal to 0 nit, the controller 140 may judge the black frame mode. At this time, the local dimming function of the backlight source 120 may be in the third mode, as shown in the area C1 in FIG. 2. In the embodiment, in the third mode, the backlight of the backlight source 120 may not emit light, as shown in FIG. 3C. The reference number "322" is the backlight state of the backlight source 120. It can be seen from FIG. 3C that all the light-emitting units 121 of the backlight source 120 do not emit light. That is, in the area C1 shown in FIG. 2, the display panel 110 may be a black frame, and the backlight source 120 does not emit light. It should be noted that, as mentioned in the previous paragraph, "brightness of the white frame" refers to the brightness of the light emitted by the display panel 110 after the light is emitted by the backlight source 120 and penetrates the display panel 110 when the light transmittance of the display panel 110 is maximum. Therefore, even though the display panel itself may still have light transmittance distributions in different positions (such as shown in the frame 312 in FIG. 3C), when the backlight source does not emit light, the display panel 110 may still present the black frame finally.

In the above embodiment, in the first mode, the local dimming function is turned off, and the backlight source 120 emits light at the predetermined brightness value L1, but the disclosure is not limited thereto. In the embodiment shown in FIG. 4, in the first mode corresponding to the area A1 in FIG. 2, at this time, the frame 410 displayed on the display panel 110 may include a particular frame area (such as the frame area 411) and another frame area outside the particular frame (such as the frame area 412), the local dimming function of the backlight source 120 may enable the first backlight area 421 in the backlight source 120 corresponding to the frame area 411 to emit light with a brightness value L1, and the brightness value L1 is fixed.

Figure 2:
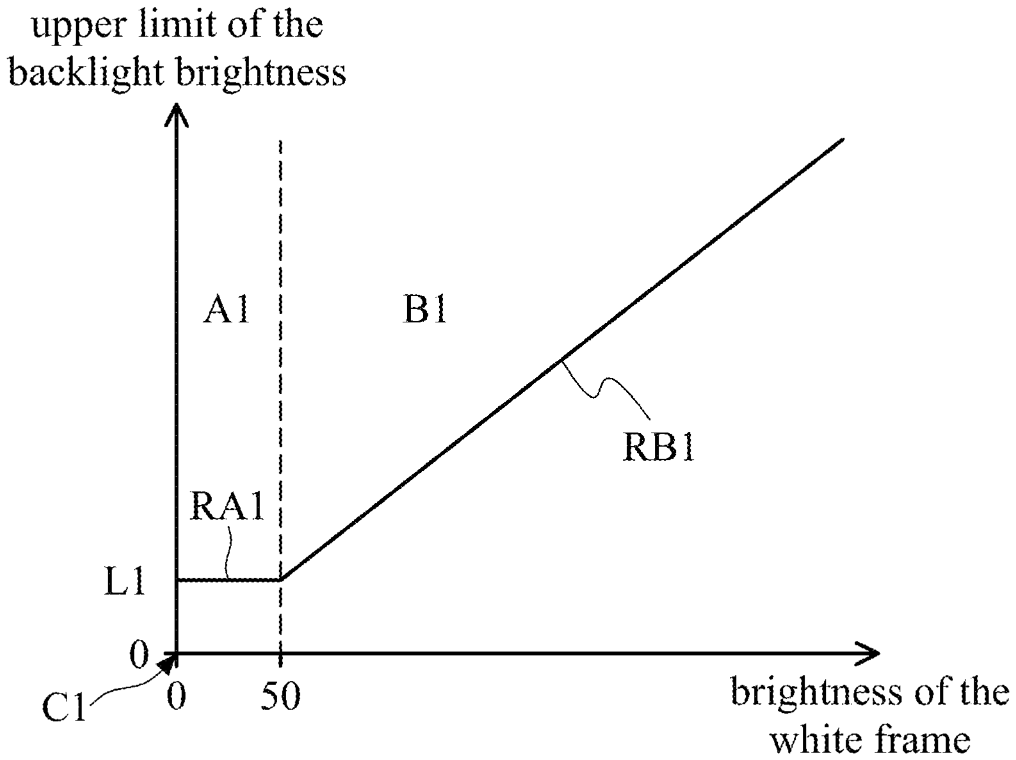
FIG. 2 is a schematic view of a corresponding relationship between a panel brightness of a display panel and a backlight brightness of a backlight source according to an embodiment of the disclosure.
Figure 3A:
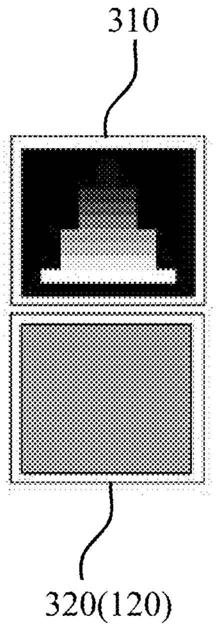
FIG. 3A is a schematic view of a display frame of a display panel and a backlight state of a backlight source according to an embodiment of the disclosure.
Figure 3B:
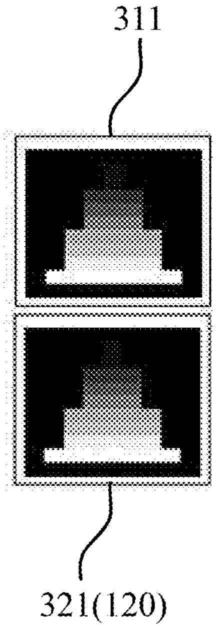
FIG. 3B is a schematic view of a display frame of a display panel and a backlight state of a backlight source according to an embodiment of the disclosure.
Figure 3C:
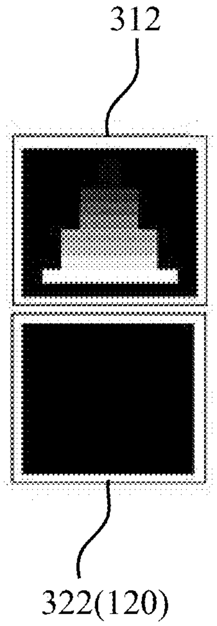
FIG. 3C is a schematic view of a display frame of a display panel and a backlight state of a backlight source according to an embodiment of the disclosure.

Furthermore, in the first mode corresponding to the area A1 in FIG. 2, the local dimming function of the backlight source 120 may further enable the second backlight area 422 in the backlight source 120 corresponding to the frame area 412 not to emit light. That is, in the embodiment, in the first mode corresponding to the area A1 in FIG. 2, the local dimming function of the backlight source 120 may be used, so that the first backlight area 421 of the backlight source 120 emit light with the predetermined brightness value (such the brightness value L1), and the second backlight area 422 of the backlight source 120 does not emit light.

Figure 5:
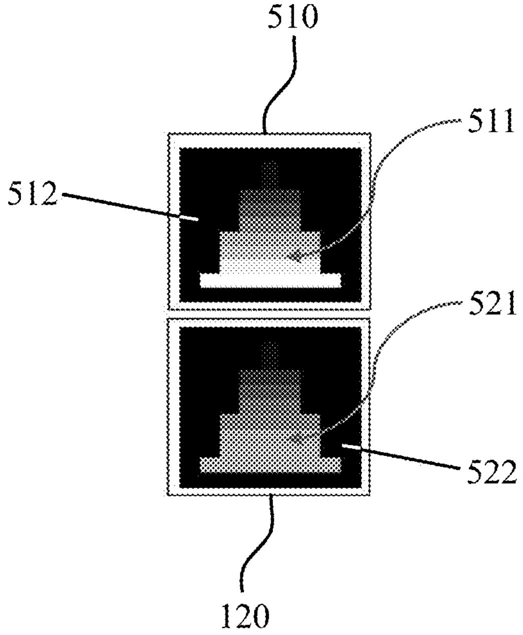
FIG. 5 is a schematic view of a display frame of a display panel and a backlight state of a backlight source according to an embodiment of the disclosure.

As shown in FIG. 5, in some other embodiments, the frame 510 displayed on the display panel 110 may have a particular frame area (such as the frame area 511) and another frame area outside the particular frame area (such as the frame area 512). In the first mode, the local dimming function of the backlight source 120 may enable the first backlight area 521 in the backlight source 120 corresponding to the frame area 511 to emit light according to the first-backlight brightness-panel brightness-ratio relationship, and the second backlight 522 in the backlight source 120 corresponding to the frame area 512 not to emit light.

Figure 6A:
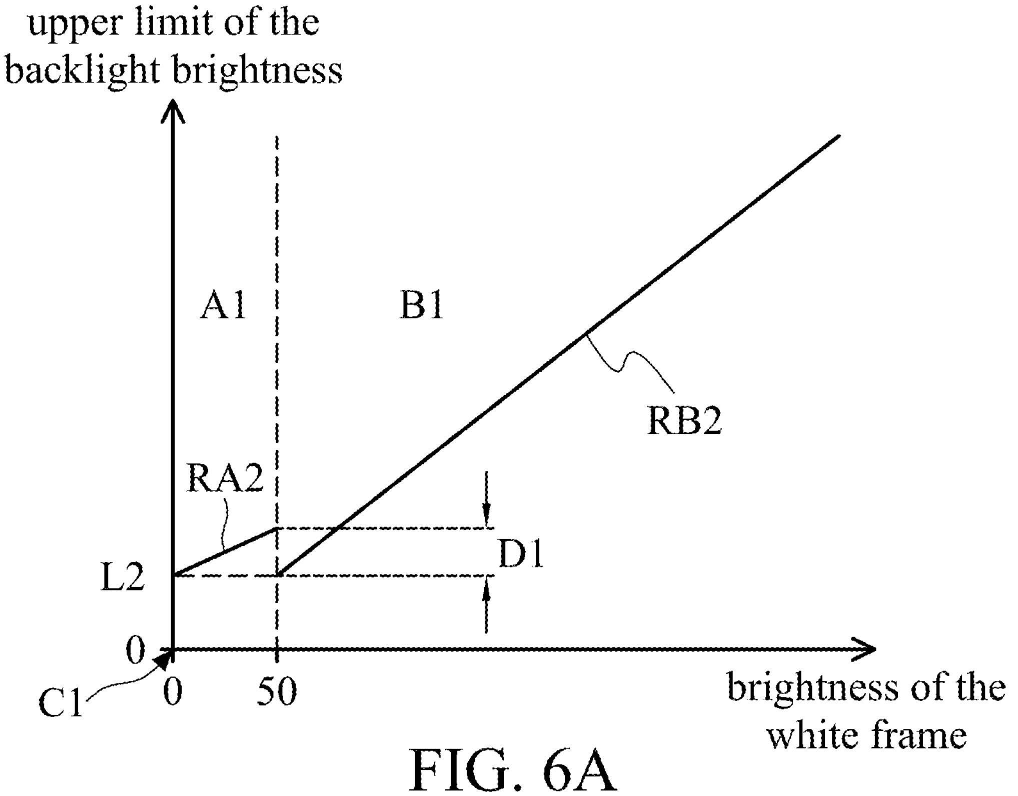
FIG. 6A is a schematic view of a corresponding relationship between a panel brightness of a display panel and a backlight brightness of a backlight source according to an embodiment of the disclosure.
Figure 6B:
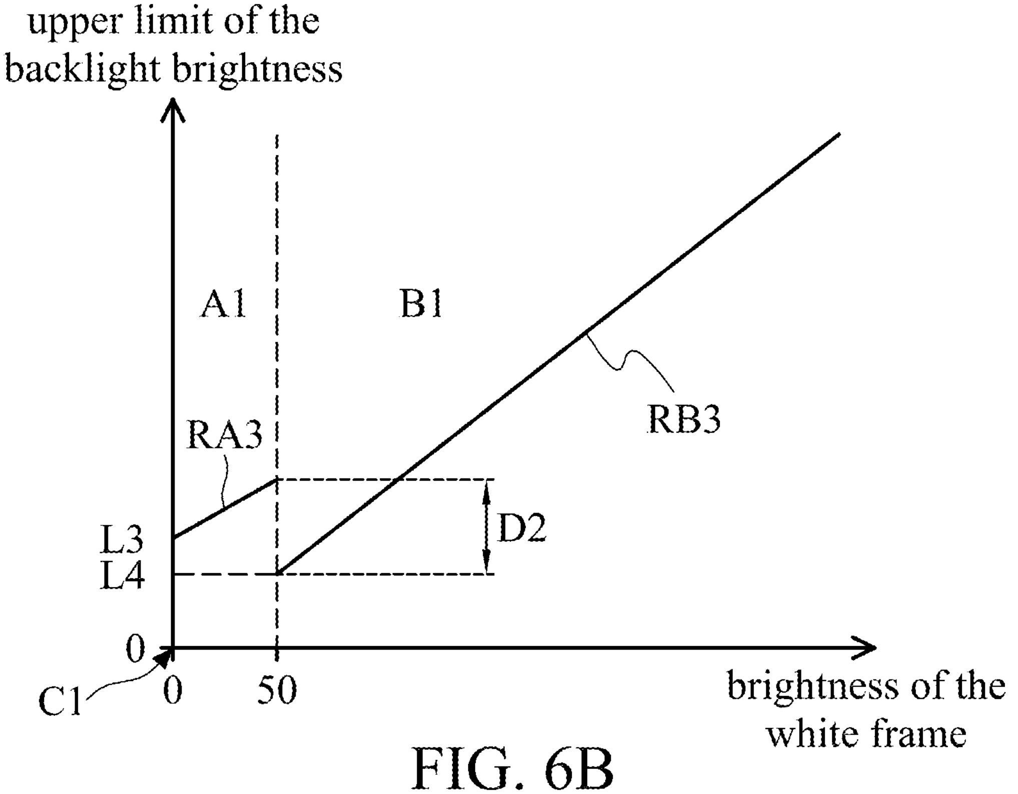
FIG. 6B is a schematic view of a corresponding relationship between a panel brightness of a display panel and a backlight brightness of a backlight source according to an embodiment of the disclosure.

In the embodiment, the above first-backlight brightness-panel brightness-ratio relationship may be represented by the straight line RA2 or RA3 in the area A1 in FIG. 6A or FIG. 6B. More specifically, in the embodiment of FIG. 5, when the backlight source 120 emits light in the first mode, the upper limit of the brightness of the first backlight area 521 of the backlight source 120 may increase with the increase of the brightness of the white frame of the display panel 110. In addition, when there are still blocks with different brightness in the frame area 511 of the frame 510, the local dimming function of the backlight source 120 may also enable the light-emitting units 121 in the first backlight area 521 to adjust the light emitting brightness according to the corresponding blocks with different brightness. For example, in FIG. 5, when the lower half of the frame area 511 in the frame 510 is brighter, the lower half of the first backlight area 521 of the backlight source 120 is also brighter. That is, in the embodiment corresponding to FIG. 5, FIG. 6A or FIG. 6B, when the backlight source 120 operates in the first mode, the local dimming function of the backlight source 120 may not only enable the part in the backlight source 120 not corresponding to the particular frame area in the frame not to emit light, but also enable the part in the backlight source 120 corresponding to the particular frame area to individually control the light-emitting units 120 according to the brightness distribution in the particular frame area.

In the embodiment corresponding to FIG. 5, FIG. 6A or FIG. 6B, when the backlight source 120 operates in the second mode, the local dimming function of the backlight source 120 may enable the backlight source 120 to emit light according to the second-backlight brightness-panel brightness-ratio relationship.

Similar to the area B1 in FIG. 2, in the area B1 shown in FIG. 6A (or FIG. 6B), the brightness of the white frame (that is, the maximum brightness of the panel) and the upper limit of the backlight brightness is represented by the straight line RB2 (or the straight line RB3), but the disclosure is not limited thereto. Similarly, in the second mode, the backlight source 120 may turn on the local dimming function. Therefore, when a dark block appear in the frame, the local dimming function may enable the part of the backlight source 120 corresponding to the dark block to dim or even not to emit light.

In addition, the difference between FIG. 6A and FIG. 6B is that the slopes of the first-backlight brightness-panel brightness-ratio relationship in the area A1 may be different, and the upper limits of the backlight brightness corresponding to the left starting point of the straight line RA2 and the left starting point of the straight line RB2 in FIG. 6A are both L2, but the upper limits of the backlight brightness corresponding to the left starting point (the brightness value L3) of the straight line RA3 and the left starting point (the brightness value L4) of the straight line RB3 in FIG. 6B are different. It should be noted that in FIG. 6A or FIG. 6B, there is a distance D1 or D2 between the maximum backlight brightness (that is, the brightness value corresponding to the right endpoint of the straight line RA2 or the straight line RA3) of the first-backlight brightness-panel brightness-ratio relationship in the area A1 and the minimum backlight brightness (that is, the brightness value corresponding to the left endpoints of the straight line RB2 or the straight line RB3) of the second-backlight brightness-panel brightness-ratio relationship in the area B1, but the discourse is not limited thereto. For example, in some embodiments, in FIG. 6A where the brightness of the panel is 50 nits, the above distance D1 may be zero, that is, the maximum backlight brightness of the first backlight brightness-panel brightness ration relationship of the area A1 may be the same as the minimum backlight brightness of the second-backlight brightness-panel brightness-ratio relationship of the area B1. In some other embodiments, the maximum backlight brightness of the first-backlight brightness-panel brightness-ratio relationship corresponding to the area A1 may still be less than the minimum backlight brightness of the second-backlight brightness-panel brightness-ratio relationship corresponding to the area B1. Furthermore, the area B1 and the area C1 in FIG. 6A or FIG. 6B are the same as or similar to the area B1 and the area C1 in FIG. 2. Accordingly, the area B1 and the area C1 in FIG. 6A or FIG. 6B may refer to the description of the embodiment of FIG. 2, and the description thereof is not repeated herein. Moreover, the area B1 and the area C1 in FIG. 6A or FIG. 6B may correspond to the embodiments shown in FIG. 3B and FIG. 3C.

Figure 7:
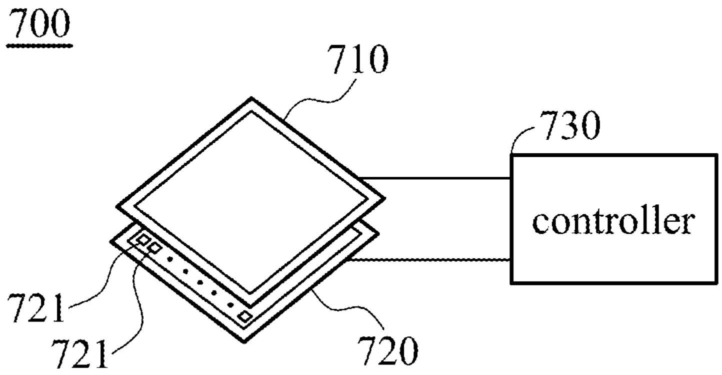
FIG. 7 is a schematic view of an electronic device according to an embodiment of the disclosure.

FIG. 7 is a schematic view of an electronic device according to an embodiment of the disclosure. Please refer to FIG. 7. The electronic device 700 may at least include a display panel 710 and a backlight source 720.

In some embodiments, the electronic device 700 may further include a controller 730. The controller 730 may be electrically connected to the display panel 710 and the backlight source 720. The controller 730 may receive a frame signal. Then, the controller 730 may judge the gray-level values of a plurality of frame areas in the frame 810 displayed on the display panel according to the above frame signal. Afterward, the controller 730 may judge an operation mode corresponding to the frame areas according to the gray-level values of a plurality of frame areas. Then, the controller 730 may control the backlight brightness of the backlight source 720 according to the operation mode corresponding to the above frame areas. It should be noted that the pixel unit in the display panel 710 may adjust the light transmittance of the pixel unit according to the gray-level value corresponding to the pixel unit, so that the light emitted by the backlight source 720 and penetrates the display panel 710 to display the frame.

In the embodiment, the display panel 710 may be a liquid crystal display panel, but the disclosure is not limited thereto. In addition, the frame displayed on the display panel 710 may be formed by a plurality of sub-frames corresponding to different colors. In the embodiment, the above sub-frames are, for example, red (R), green (G) and blue (B) frames, but the disclosure is not limited thereto. That is, the frame displayed on the display panel 710 may be formed by the sub-frames with at least three colors (such as red, green and blue). In addition, when the frame displayed on the display panel 710 has the maximum brightness, the above sub-frames may have the maximum gray-level value at the same time. In the embodiment, the above maximum gray-level value is, for example, 255, 511, 1023, or another suitable gray-level value, but the disclosure is not limited thereto.

The backlight source 720 may be disposed below the display panel 710, and include a plurality of light-emitting units 721. Furthermore, the backlight source 720 may be disposed below the display panel 710 when viewed from the top view, and the light-emitting units 721 may be arranged in a matrix, but the disclosure is not limited thereto. In addition, the backlight source 720 may have a local dimming function. In the embodiment, the local dimming function may enable the first backlight area of the backlight source 720 to emit light with the first brightness, and enable the second backlight area outside the first backlight area of the backlight source 720 not to emit light or to emit light with the second brightness, wherein the first brightness is different from the second brightness, but the disclosure is not limited thereto.

Figure 8:
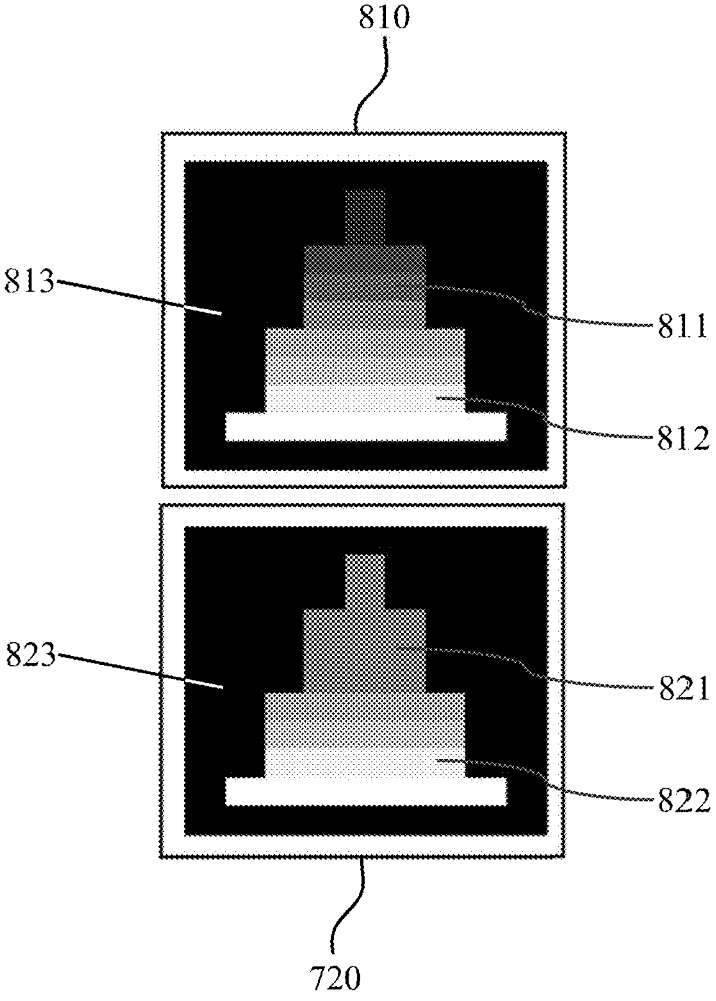
FIG. 8 is a schematic view of a display frame of a display panel and a backlight state of a backlight source according to an embodiment of the disclosure.
Figure 9:
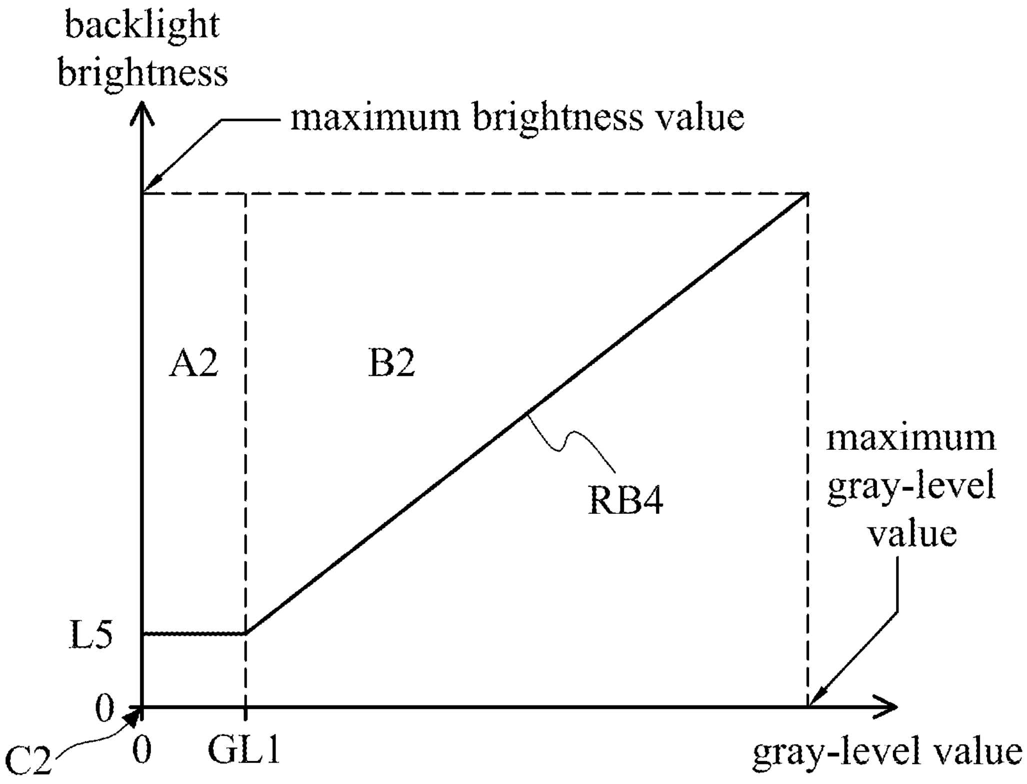
FIG. 9 is a schematic view of a corresponding relationship between a gray-level value of a frame of a display panel and a backlight brightness of a backlight source according to an embodiment of the disclosure.

Please refer to FIG. 8 and FIG. 9. In some embodiments, when the frame 810 displayed on the display panel 710 has a frame area 811, wherein the gray-level value of the position of each of the above sub-frames (that, is a sub-frame of each color) corresponding to the frame area 811 is greater than zero gray-level value and less than or equal to ⅕ of the maximum gray-level value (as shown by the reference number "GL1" in FIG. 9), the controller 730 judges that the frame area 811 is in the low-brightness mode. At this time, the local dimming function of the backlight source 720 may use the first mode to control the light-emitting units 721 of the first backlight area 821 corresponding to the frame area 811.

In the embodiment, in the first mode, the first backlight area 821 corresponding to the frame area emits light at predetermined fixed brightness value L5, as shown in area A2 of FIG. 8 and FIG. 9.

In addition, when the frame 810 has another frame area (such as the frame area 812 in FIG. 8), wherein the gray-level value of the position of the sub-frame with any color corresponding to the frame area 812 is greater than ⅕ of the maximum gray-level value, the controller 730 judges that the frame area 812 is in the general mode. At this time, the local dimming function of the backlight source 720 may use the second mode to the light-emitting units 721 of the second backlight area 822 corresponding to the frame area 812. In the second mode, the light-brightness value of the light-emitting units 721 may increase with the increase of the gray-level value, and the relationship between the backlight brightness and the gray-level value may be represented by the straight line RB4 in the area B2 of FIG. 9. That is, in the area B2 shown in FIG. 9, the frame 810 may have a frame area 812, the gray-level value of the position of at least one of the above sub-frames corresponding to the frame area 812 is greater than ⅕ of the maximum gray-level value, and the brightness value of the position of the second backlight area 822 of the backlight source 720 corresponding to the frame area 812 may be adjusted. It should be noted that although the relationship between the backlight brightness and the gray-level value is expressed as a linear ratio of the straight line shape in the disclosure, in some embodiments, the relationship between the backlight brightness and the gray-level value may be expressed as an non-linear ratio of the non-straight line shape.

In addition, the frame 810 may also have a "zero gray-level value area" (such as the frame area 813). In the embodiment, the gray-level value of the position of the sub-frames with each color corresponding to the "zero gray-level value area" is zero, i.e., the frame area 813 of the display panel 710 presents the black block. At this time, the controller 730 judges that the frame area 813 is in the zero gray-level mode. The local dimming function of the backlight source 720 may use the third mode to control the light-emitting units 721 of the third backlight area 823 corresponding to the frame area 813. In the embodiment, in the third mode, the third backlight area 823 in the backlight source 720 corresponding to the frame area 813 does not emit light. That is, in the area C2 shown in FIG. 9, the frame area 813 of the display panel 710 presents as black, and the brightness value of the third backlight area 823 in the backlight source 720 corresponding to the frame area 813 is zero.

Figure 10:
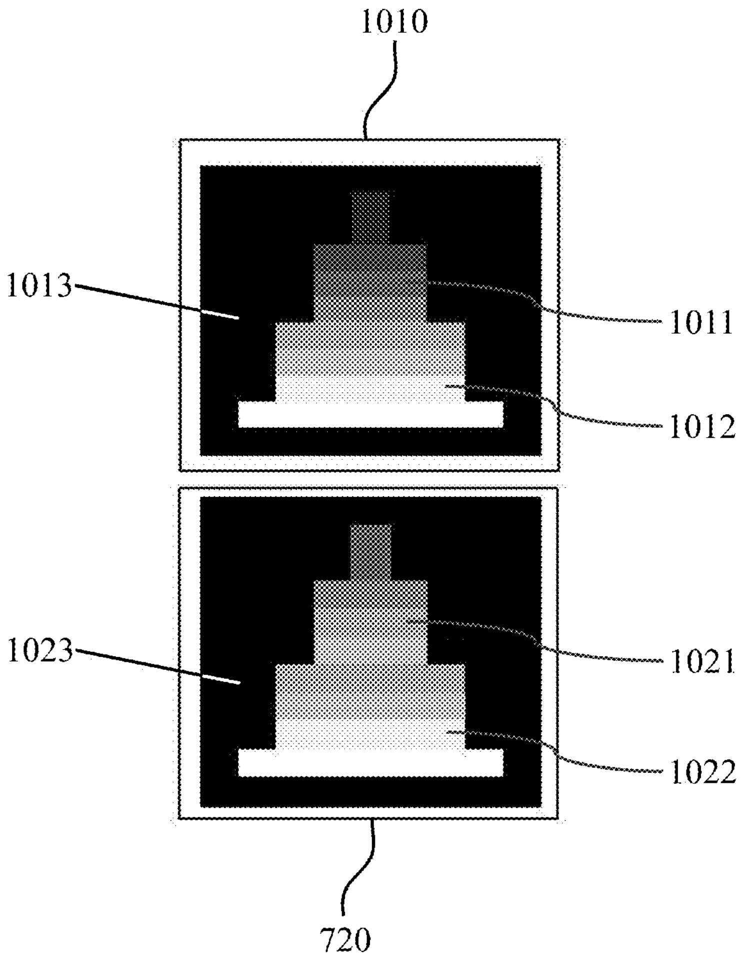
FIG. 10 is a schematic view of a display frame of a display panel and a backlight state of a backlight source according to an embodiment of the disclosure.
Figure 11A:
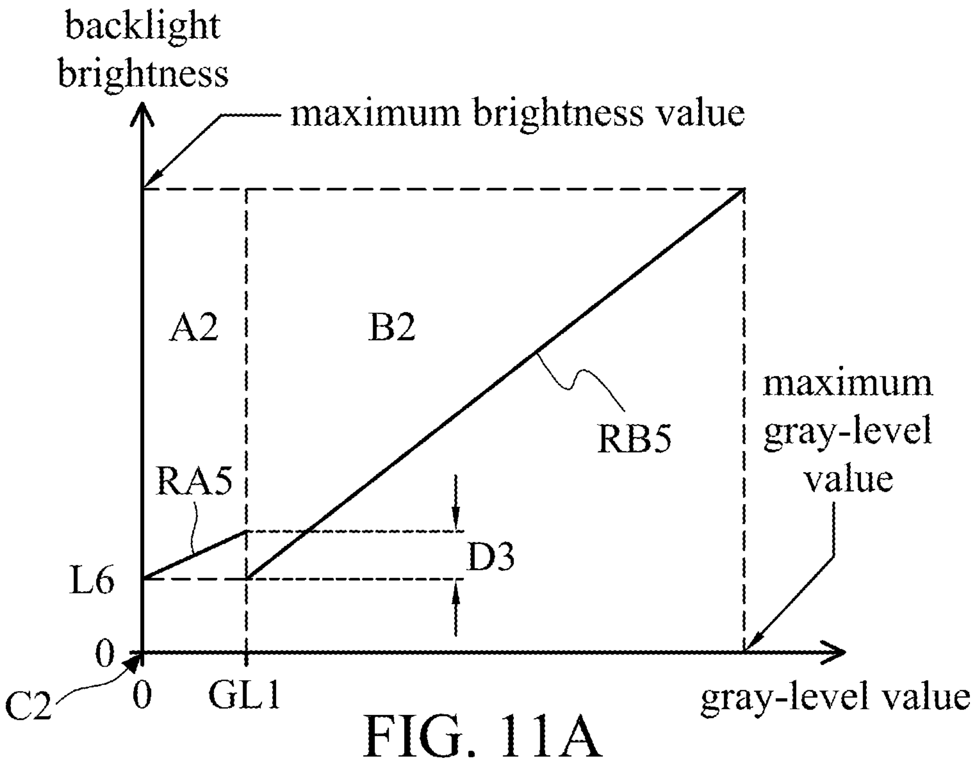
FIG. 11A is a schematic view of a corresponding relationship between a gray-level value of a frame of a display panel and a backlight brightness of a backlight source according to an embodiment of the disclosure.
Figure 11B:
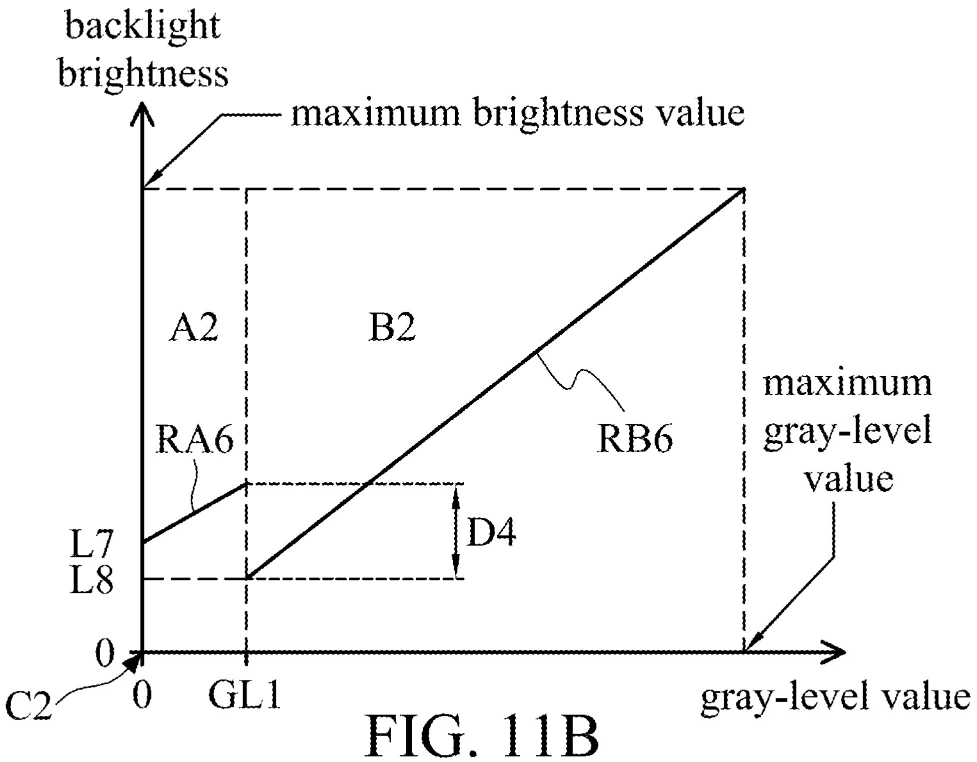
FIG. 11B is a schematic view of a corresponding relationship between a gray-level value of a frame of a display panel and a backlight brightness of a backlight source according to an embodiment of the disclosure.

Please refer to FIG. 10, FIG. 11A and FIG. 11B. In some embodiments, In the frame area 1011 of the frame 1010 displayed on the display panel 710, when the gray-level value of the position of the sub-frames with each color corresponding to the frame area 1011 is greater than zero gray-level value and less than or equal to ⅕ of the maximum gray-level value (as shown by the reference number "GL1" in FIG. 11A or FIG. 11B), the controller 730 judges that the frame area 1011 is in the low gray-level mode. At this time, the local dimming function of the backlight source 720 may use the first mode to control the light-emitting units 721 of the first backlight area 1021 corresponding to the frame area 1011. When the frame 1010 has a frame area 1012 and the gray-level value of the position of at least one of the above sub-frames corresponding to the frame area 1012 is greater than ⅕ of the maximum gray-level value, the controller 730 judges the frame area 1012 is in the general mode. At this time, the local dimming function uses the second mode to control the light-emitting units 721 of the second backlight area 1022 in the backlight source 720 corresponding to the frame area 1012, as shown in FIG. 10 and FIG. 11A or FIG. 10 and FIG. 11B.

In the embodiment, in the first mode, the light-emitting units 721 of the first area 1021 may emit light according to the first-backlight brightness-gray-level value-ratio relationship. In the second mode, the light-emitting units 721 of second area 1022 may emit light according to the second-backlight brightness-gray-level value-ratio relationship. The first-backlight brightness-gray-level value-ratio relationship may be different from the second-backlight brightness-gray-level value-ratio relationship, but the disclosure is not limited thereto. The first-backlight brightness-gray-level value-ratio relationship may be represented by the straight line RA5 or RA6 in the area A2 shown in FIG. 11A or FIG. 11B, and the second-backlight brightness-gray-level value-ratio relationship may be represented by the straight line RB5 or RB6 in the area B2 shown in FIG. 11A or FIG. 11B. The above statement that "first-backlight brightness-gray-level value-ratio relationship may be different from the second-backlight brightness-gray-level value-ratio relationship" may be understood as the straight line RA5 (or the straight line RA6) and the straight line RB5 (or the straight line RB6) have different slopes, but the disclosure is not limited. In addition, the difference between FIG. 11A and FIG. 11B is that the first-backlight brightness-gray-level value-ratio relationship in the area A2 may be different, and the brightness values corresponding to the left starting point of the straight line RA5 and the left starting point of the straight line RB5 in FIG. 11A are both L6, but the brightness values corresponding to the left starting point (the brightness value L7) of the straight line RA6 and the left starting point (the brightness value L8) of the straight line RB6 in FIG. 11B are different.

In some embodiments, in FIG. 11A and FIG. 11B, there is a distance D3 or D4 between the maximum backlight brightness (that is, the right endpoint of the straight line RA5 or the straight line RA6) of the first-backlight brightness-gray-level value-ratio relationship in the area A2 and the minimum backlight brightness (that is, the left endpoints of the straight line RB5 or the straight line RB6) of the second backlight brightness-gray-level ratio relationship in the area B2, but the discourse is not limited thereto. That is, the maximum brightness emitted by the light-emitting units 721 of the first backlight area 1021 in the backlight source 720 according to the first backlight brightness-gray-level ratio relationship may be greater than the minimum brightness emitted by the light-emitting units 721 of the second backlight area 1022 in the backlight source 720 according to the second backlight brightness-gray-level ratio relationship, as shown in FIG. 11A or FIG. 11B, but the disclosure is not limited thereto. In some embodiments, the maximum backlight brightness of the first backlight brightness-gray-level ratio relationship corresponding to the area A2 may be equal to the minimum backlight brightness of the second backlight brightnes s-gray-level ratio relationship corresponding to the area B2. In some other embodiments, the maximum backlight brightness of the first backlight brightness-gray-level ratio relationship corresponding to the area A2 may be less than the minimum backlight brightness of the second backlight brightness-gray-level ratio relationship corresponding to the area B2. Furthermore, the area B2 and the area C2 in FIG. 11A or FIG. 11B are the same as or similar to the area B2 and the area C2 in FIG. 9. Accordingly, the area B2 and the area C2 in FIG. 11A or FIG. 11B may refer to the description of the embodiment of FIG. 9, and the description thereof is not repeated herein.

Figure 12:
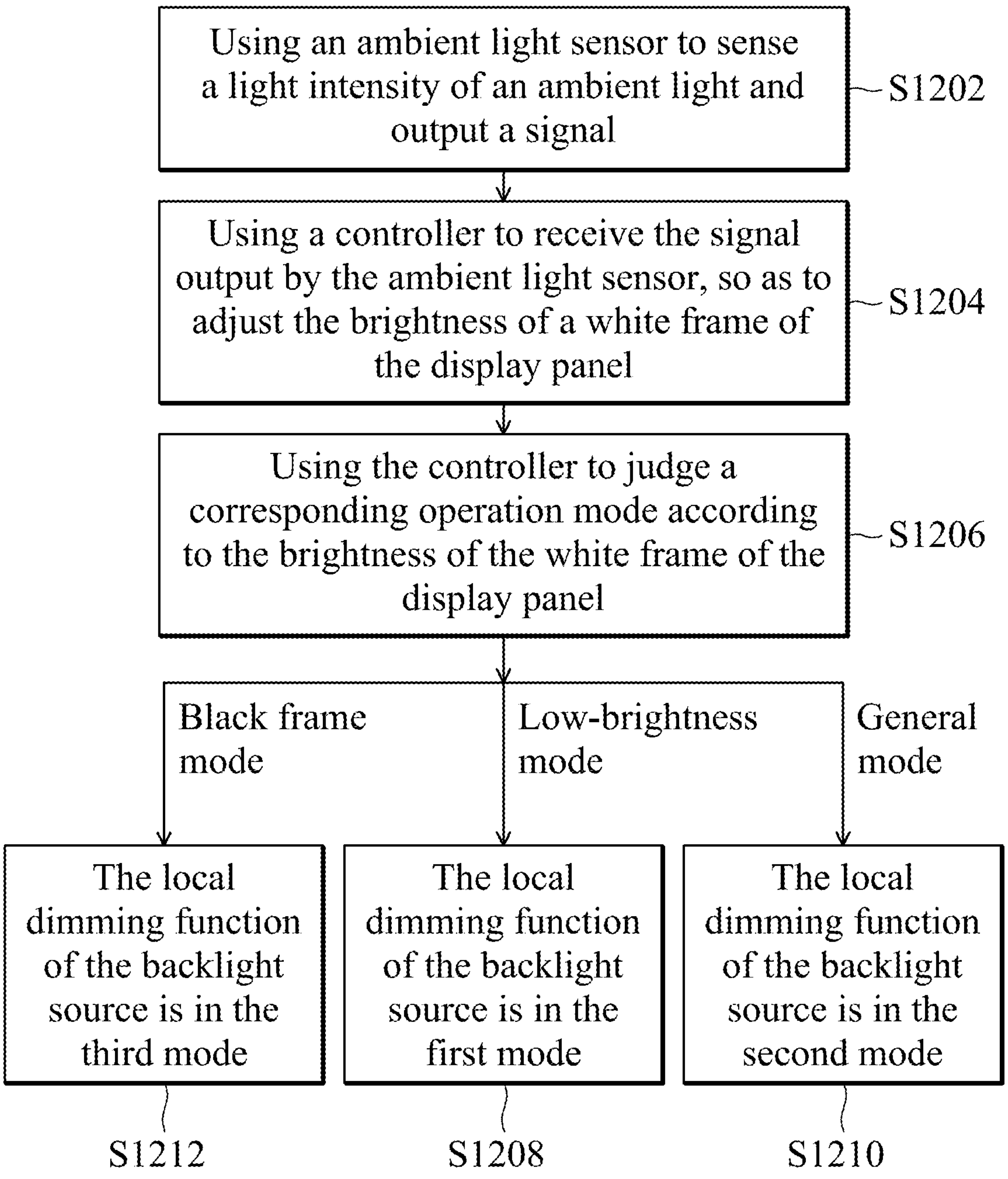
FIG. 12 is a flowchart of an operation method of an electronic device according to an embodiment of the disclosure.

FIG. 12 is a flowchart of an operation method of an electronic device according to an embodiment of the disclosure. FIG. 12 may correspond to the embodiments of FIG. 1 to FIG. 6B. In step S1202, the method involves using an ambient light sensor to sense a light intensity of an ambient light and output a signal. In step S1204, the method involves using a controller to receive the signal output by the ambient light sensor, so as to adjust the brightness of a white frame of the display panel. In step S1206, the method involves using the controller to judge a corresponding operation mode according to the brightness of the white frame of the display panel. When the controller judges that the operation mode is the low-brightness mode, the method performs step S1208, and the local dimming function of the backlight source is in the first mode. In some embodiments, in the first mode corresponding to the area A1 of FIG. 2 and FIG. 3A, the local dimming function is turned off, and the backlight source emits light at the predetermined brightness value (such as the brightness value L1 in FIG. 2).

Figure 4:
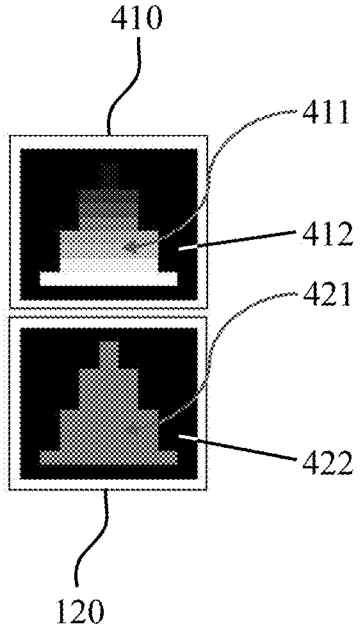
FIG. 4 is a schematic view of a display frame of a display panel and a backlight state of a backlight source according to an embodiment of the disclosure.

In some embodiments, in the first mode corresponding to the area A1 in FIG. 2 and FIG. 4, the frame displayed on the display panel has the particular frame area, the local dimming function enables the first backlight area in the backlight source corresponding to the particular frame area to emit light at the predetermined brightness value (such as the brightness value L1 in FIG. 2), and enables the backlight corresponding to the second backlight area outside the particular frame area not to emit light. In some embodiments, in the first mode corresponding to FIG. 5 and the area A1 in FIG. 6A or FIG. 5 and the area A1 in FIG. 6B, the frame displayed on the display panel has the particular frame area, the local dimming function enables the first backlight area in the backlight source corresponding to the particular frame area to emit light according to the first-backlight brightness-panel brightness-ratio relationship, and enables the backlight source corresponding to the second backlight area outside the particular frame area not to emit light.

When the controller judges the general mode, the method performs step S1210, and the local dimming function of the backlight source is in the second mode. In some embodiments, in the second mode, the backlight source may turn on the local dimming function. Therefore, when a dark block appears in the frame, the local dimming function may enable the part of backlight source corresponding to the dark block to dim or even not to emit light.

When the controller judges the black frame mode, the method performs steps S1212, and the local dimming function of the backlight source is in the third mode. In some embodiments, in the third mode corresponding to the area C1 in FIG. 2 and FIG. 3C, the area C1 in FIG. 6A and FIG. 3C, or the area C1 in FIG. 6B and FIG. 3C, the backlight source does not emit light and the display panel displays the black frame.

Figure 13:
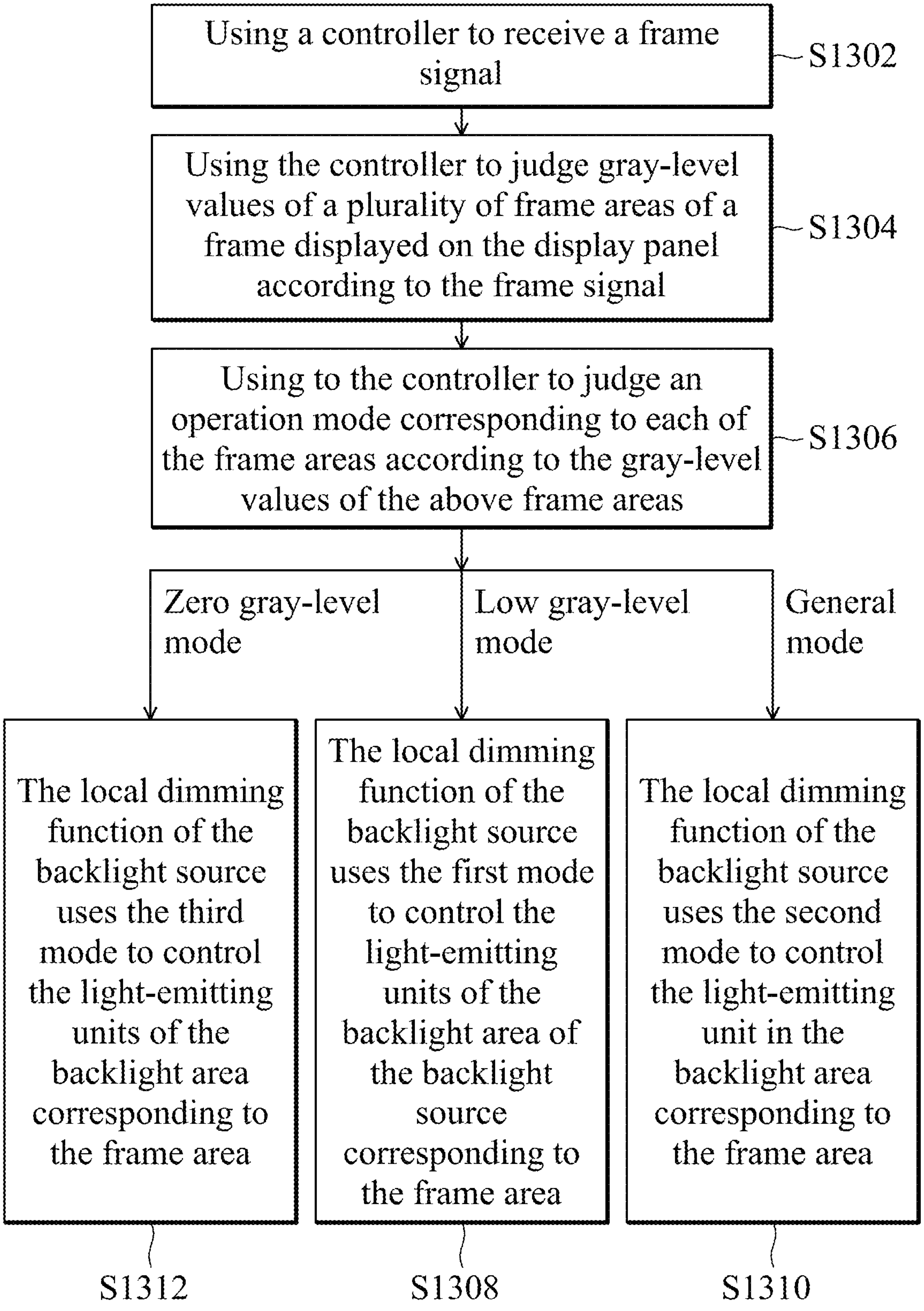
FIG. 13 is a flowchart of an operation method of an electronic device according to an embodiment of the disclosure.

FIG. 13 is a flowchart of an operation method of an electronic device according to an embodiment of the disclosure. FIG. 13 may correspond to the embodiments of FIG. 7 to FIG. 11B. In step S1302, the method involves using a controller to receive a frame signal. In step S1304, the method involves using the controller to judge gray-level values of a plurality of frame areas of a frame displayed on the display panel according to the frame signal. In step S1306, the method involves using to the controller to judge an operation mode corresponding to each of the frame areas according to the gray-level values of the above frame areas. When the controller judges that a frame area of the display panel is in the low gray-level mode, the method performs S1308, and the local dimming function of the backlight source uses the first mode to control the light-emitting units of the backlight area of the backlight source corresponding to the frame area. In some embodiments, in the frames 811 and 821 corresponding to FIG. 8 and the area A2 in FIG. 9, the light-emitting units in the backlight area corresponding to the frame area emit light at the predetermined brightness value (such as L5 in FIG. 9). In some embodiments, in the first mode corresponding to the frames 1011 and 1021 in FIG. 10 and the area A2 in FIG. 11A, or the frames 1011 and 1021 in FIG. 10 and the area A2 in FIG. 11B, the backlight area corresponding to the frame area emits light according to the first-backlight brightness-gray-level value-ratio relationship.

When the controller judges that the frame area of the display panel is in the general mode, the method performs S1310, and the local dimming function of the backlight source uses the second mode to control the light-emitting unit in the backlight area corresponding to the frame area. In some embodiments, in the second mode corresponding to the frame areas 812 and 822 in FIG. 8 and the area B2 in FIG. 9, the frame areas 1012 and 1022 in FIG. 10 and the area B2 in FIG. 11A, or the frame areas 1012 and 1022 in FIG. 10 and the area B2 in FIG. 11B, the light-emitting units of the second backlight area emit light according to the second-backlight brightness-gray-level value-ratio relationship. In addition, the first-backlight brightness-gray-level value-ratio relationship may be different from the second-backlight brightness-gray-level value-ratio relationship.

When the controller judges that the frame area of the display panel is in the zero gray-level mode, the method performs step S1312, and the local dimming function of the backlight source uses the third mode to control the light-emitting units of the backlight area corresponding to the frame area. In some embodiments, in the third mode corresponding to the frame areas 813 and 823 in FIG. 8 and the area C2 in FIG. 9, the frame areas 1013 and 1023 in FIG. 10 and the area C2 in FIG. 11A, or the frame areas 1013 and 1023 in FIG. 10 and the area C3 in FIG. 11B, the backlight source does not emit light, and the frame area displays black.

In summary, according to the electronic device disclosed by the embodiments of the disclosure, when the brightness of the white frame of the display panel is greater than 0 nit and less than or equal to 50 nits, the local dimming function of the backlight source is in the first mode, and when the brightness of the white frame of the display panel is greater than 50 nits, the local dimming function of the backlight source is in the second mode. In addition, when the frame displayed on the display panel includes the first frame area and the second frame area and the gray-level value of the position of each of the sub-frames used to form the frame corresponding to the first frame area is greater than zero gray-level value and less than or equal to ⅕ of the maximum gray-level value, the local dimming function of the backlight source uses the first mode to control the light-emitting units in the backlight area corresponding to the first frame area. When the gray-level of the position of at least one of the above sub-frames corresponding to the second frame area is greater than ⅕ of the maximum gray-level value, the local dimming function of the backlight source uses the second mode to control the light-emitting units in the backlight area corresponding to the second frame area. Therefore, it may avoid the deterioration of the entire brightness uniformity of the backlight source, which may cause poor frame quality of the low gray-level or the low-brightness, or improve the frame uniformity of the low-brightness or the low gray-level.

While the disclosure has been described by way of examples and in terms of the preferred embodiments, it should be understood that the disclosure is not limited to the disclosed embodiments. On the contrary, it is intended to cover various modifications, combinations, and similar arrangements (as would be apparent to those skilled in the art). Therefore, the scope of the appended claims should be accorded the broadest interpretation to encompass all such modifications, combinations, and similar arrangements.

What is claimed is:

1. An electronic device, comprising:

a display panel;

a backlight source, disposed below the display panel and comprising a plurality of light-emitting units;

an ambient light sensor, configured to detect a brightness of an ambient light; and a controller, electrically connected to the display panel, the backlight source, and the ambient light sensor, and configured to judge a general mode or a low-brightness mode according to according to detecting results of the ambient light sensor, wherein in the low-brightness mode, a brightness of a white frame of the display panel is greater than 0 nit and less than or equal to 50 nits, and in the general mode, the brightness of the white frame of the display panel is greater than 50 nits;

wherein the backlight source comprises a local dimming function, when the controller judges the low-brightness mode, the local dimming function is in a first mode, and when the controller judges the general mode, the local dimming function is in a second mode, wherein in the first mode, the local dimming function is turned off, and the backlight source emits light at a predetermined brightness value.

2. The electronic device as claimed in claim 1, wherein in the second mode, the local dimming function is turned on, and the light-emitting units of the backlight source emit light according to a second backlight brightness-panel brightness ratio relationship.

3. The electronic device as claimed in claim 1, wherein a minimum backlight brightness of a second backlight brightness-panel brightness ratio relationship is different from a maximum backlight brightness of a first-backlight brightness-panel brightness-ratio relationship in the first mode.

4. The electronic device as claimed in claim 1, wherein in the second mode, a maximum brightness value of a backlight brightness of the backlight source is increased with the increase of the brightness of the white frame of the display panel.

5. The electronic device as claimed in claim 1, wherein in the second mode, a brightness distribution of the backlight source corresponds to a brightness distribution of a frame displayed on the display panel.

6. The electronic device as claimed in claim 1, wherein the controller further judges a black frame mode according to according to the detecting results of the ambient light sensor, wherein in the black frame mode, a brightness of a white frame of the display panel is equal to 0 nit;

wherein when the controller judges the black frame mode, the local dimming function is in a third mode.

7. The electronic device as claimed in claim 6, wherein in the third mode, the light-emitting units of the light source do not emit light.

8. An electronic device, comprising:

a display panel;

a backlight source, disposed below the display panel and comprising a plurality of light-emitting units;

an ambient light sensor, configured to detect a brightness of an ambient light; and a controller, electrically connected to the display panel, the backlight source, and the ambient light sensor, and configured to judge a general mode or a low-brightness mode according to according to detecting results of the ambient light sensor, wherein in the low-brightness mode, a brightness of a white frame of the display panel is greater than 0 nit and less than or equal to 50 nits, and in the general mode, the brightness of the white frame of the display panel is greater than 50 nits;

wherein the backlight source comprises a local dimming function, when the controller judges the low-brightness mode, the local dimming function is in a first mode, and when the controller judges the general mode, the local dimming function is in a second mode;

wherein in the first mode, a frame displayed on the display panel comprises a particular frame area, and the local dimming function enables the light-emitting units in the backlight source corresponding to a first backlight area of the particular frame area to emit light according to a first backlight brightness-panel brightness ratio relationship, and enables the light-emitting units in the backlight source corresponding to another second backlight area outside the particular frame area to not emit light.

* * * * *